United States Patent [19]
Gordon

[11] 3,962,844
[45] June 15, 1976

[54] PROCESS FOR FORMING AND APPLYING A HERMETIC, HEAT SEALED CLOSURE

[75] Inventor: Robert Louis Gordon, Monroe, N.Y.

[73] Assignee: International Paper Company, New York, N.Y.

[22] Filed: Mar. 5, 1975

[21] Appl. No.: 555,374

Related U.S. Application Data
[63] Continuation-in-part of Ser. No. 499,177, Aug. 21, 1974, abandoned.

[52] U.S. Cl. .................................. 53/39; 53/41; 53/42; 53/141; 53/329
[51] Int. Cl.² .................. B65B 51/20; B65B 7/28
[58] Field of Search ............. 53/39, 41, 42, 373, 53/329, 141

[56] References Cited
UNITED STATES PATENTS

| | | | |
|---|---|---|---|
| 2,920,431 | 1/1960 | Izumi .................................. | 53/141 |
| 2,976,655 | 3/1961 | Dreyfus et al. ..................... | 53/39 X |
| 3,060,652 | 10/1962 | Eckman ............................... | 53/22 |
| 3,161,560 | 12/1964 | Paquin et al. ...................... | 156/244 X |
| 3,246,446 | 4/1966 | Powers ................................ | 53/42 |
| 3,303,760 | 2/1967 | Tobias ................................. | 93/44.1 |
| 3,345,798 | 10/1967 | Sternau ............................... | 53/41 |
| 3,352,086 | 11/1967 | Bischof et al. ..................... | 53/39 |
| 3,389,896 | 6/1968 | Wilcox et al. ..................... | 53/141 X |
| 3,408,787 | 11/1968 | Mueller .............................. | 53/37 |
| 3,426,504 | 2/1969 | Christensson ...................... | 53/329 X |
| 3,481,100 | 12/1969 | Bergstrom .......................... | 53/22 |
| 3,491,510 | 1/1970 | Sternau ............................... | 53/42 |
| 3,522,687 | 8/1970 | Mahaffy ............................. | 53/141 X |
| 3,621,637 | 11/1971 | Sternau ............................... | 53/42 |
| 3,708,954 | 1/1973 | Wilke et al. ....................... | 53/329 |
| 3,720,038 | 3/1973 | Bryan, Jr. et al. ................. | 53/39 |
| 3,783,581 | 1/1974 | Pierce ................................. | 53/37 |

Primary Examiner—Travis S. McGehee
Assistant Examiner—Horace M. Culver
Attorney, Agent, or Firm—Ronald A. Schapira

[57] ABSTRACT

A process for providing a hermetic, heat-sealed closure for a filled, thermoplastic or thermoplastic coated container by the steps of: providing a continuous web of a thermoplastic material, having a temperature within the drooping and heat-sealing ranges of the thermoplastic material, draped over the mouth of the filled container; urging the web inwardly of the mouth of the container so that the web overlies interior and exterior, thermoplastic surfaces of the mouth of the container; and pressing the web against the interior and exterior, thermoplastic surfaces of the mouth of the container to form a heat-sealed bond, by directing a stream of a gas against an exposed surface of the web overlying a thermoplastic surface of the mouth of the container.

12 Claims, 4 Drawing Figures

PROCESS FOR FORMING AND APPLYING A HERMETIC, HEAT SEALED CLOSURE

Cross-Reference to Related Applications

This is a continuation-in-part application of Ser. No. 499,177, filed Aug. 21, 1974, and now abandoned, of Robert L. Gordon, entitled "Hermetic, Heat-Sealed Closure."

Background of the Invention

This invention relates to a method of forming hermetic, heat-sealed closures on thermoplastic or thermoplastic coated containers.

In recent years, plastic containers with hermetically-sealed plastic closures have become quite popular for packaging a wide variety of products intended for large scale, consumer sales. Such containers and closures have formed relatively simple and inexpensive, as well as attractive and durable, packages for a wide variety of materials, such as milk and milk products, juices and soaps. Typically, the packages formed from such containers and closures also have been adapted to maintain the freshness and purity of the packaged materials at a relatively high level for an extended period of time.

Various techniques for heat-shrinking closures on to containers and for bonding preformed, plastic lids on to containers have been employed for providing hermetic closures. See, for example, U.S. Pat. Nos. 3,345,798, 3,621,637, and 3,491,510, wherein hermetic closures have been formed utilizing heat-shrinkable, oriented plastic films, and U.S. Pat. Nos. 3,481,100, 3,783,581, 3,708,954, 3,060,652, and 3,408,787, wherein preformed lids have been heat-sealed on to containers to form hermetic clousures.

However, the use of heat-shrinkable, oriented plastic films has not afforded an entirely satisfactory, low cost method for forming closures on containers. Heat-shrinkable, oriented plastic film materials have been relatively expensive, and the resulting closures have tended to be prone to being torn or punctured. For this reason, such closures typically have had to be provided, at additional expense, with reinforcing or protective, underlying or overlying caps. See, for example, U.S. Pat. Nos. 3,621,637 and 3,491,510.

Likewise, the use of preformed lids has not been entirely satisfactory for providing low cost closures on containers. Preforming lids for closures has required the use of additional, costly equipment, such as injection molding or thermoforming equipment. In addition, costly equipment usually has been needed to place the preformed lids on the containers and to then heat-seal the lids to the containers. Furthermore, preforming the lids generally has required that equipment and manpower be utilized at a substantial expense to convey and store the preformed lids at various times after the lids are formed and before the lids are placed on the containers.

A further problem encountered with heretofore available methods for forming closures on plastic or plastic coated containers has been that such methods have not been suitable for forming hermetic closures on a container having a square or rectangular mouth. In attempting to seal the mouth of a square or rectangular container, it has been found extremely difficult to provide a seal at the 90° corners of the container's mouth. For this reason, containers and lids typically have been preformed, where practical, with rounded corners. Where the mouth of a container has included 90° corners, a sealant material generally has had to be applied, at relatively great expense, around the entire mouth of the container, to assure that a hermetic seal is obtained in the corner regions.

There has been an unfilled need therefore for a relatively inexpensive method of providing a hermetic closure for plastic or plastic coated containers, particularly containers having square or rectangular mouths.

SUMMARY OF THE INVENTION

In accordance with this application, a process is provided for forming a hermetic, heat-sealed closure on a filled, thermoplastic or thermoplastic coated container by the steps of: providing a web of a thermoplastic material, having a temperature within the drooping and heat-sealing ranges of the thermoplastic material, draped over the mouth of the container; urging the web inwardly of the mouth of the container so that the web overlies interior and exterior, thermoplastic surfaces of the mouth of the container; and pressing the web against the interior and exterior surfaces of the mouth of the container to form a heat-sealed bond, by directing a stream of a gas against an exposed surface of the web overlying a thermoplastic surface of the mouth of the container.

By this process, a hermetic, heat-sealed closure can be expeditiously obtained for a container utilizing relatively inexpensive, continuous webs of thermoplastic materials for the closure and relatively inexpensive process equipment for heating the thermoplastic material, urging the web into the mouth of the container, and heat-sealing the web to the mouth of the container. This process is particularly advantageous in forming a closure on a square or rectangular container.

DETAILED DESCRIPTION OF THE INVENTION

This invention relates to a process for forming a hermetic closure on the mouth of a thermoplastic or thermoplastic coated container, particularly a container having a square or rectangular mouth. As formed, the closure is heat-sealed to the interior and exterior, thermoplastic surfaces of the mouth of the container to provide a hermetic seal for the contents of the container. The closure of the process of this invention is formed, in situ, on the mouth of the container, from a heated, continuous web of a thermoplastic material.

Figure 1:
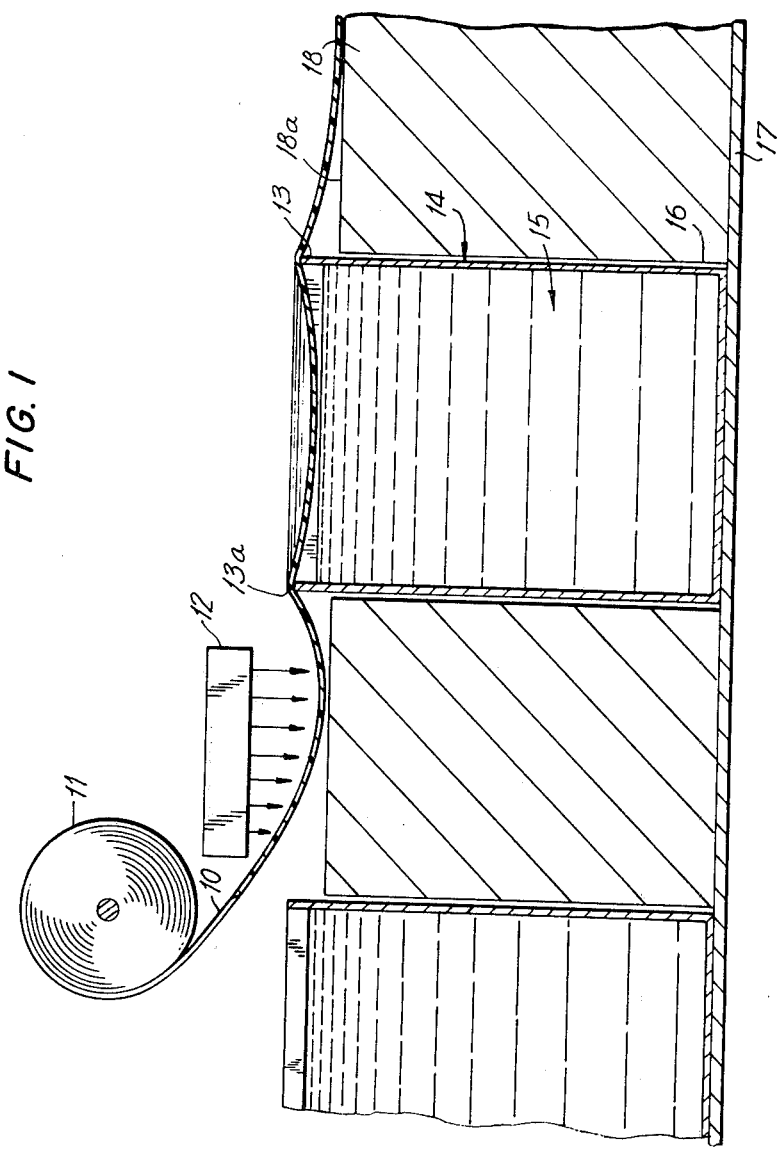
FIG. 1 is a partial, sectional view, illustrating the first station in the process of this application, wherein a heated, continuous, thermoplastic web is draped over the mouth of a thermoplastic or thermoplastic coated container.

FIG. 1 shows the first station in the process of this application. As shown in FIG. 1, a continuous web 10 of a thermoplastic material is unwound from a roll 11 and is heated by a heating means 12 to provide a web 10 of a heated thermoplastic material. Alternatively, the web 10 of a heated thermoplastic material can be provided by other methods, such as by extruding a continuous web 10 of a heated thermoplastic material. Then, the web 10 of a heated thermoplastic material is draped over the mouth, generally 13, of a container 14.

In this process, the thermoplastic material of the web 10 can be any conventional thermoplastic material capable of being heat-sealed to another material, such as another thermoplastic material. Among such thermoplastic materials are the polyolefins, such as polyethylene and polypropylene; the sarans, such as polyvinylidene chloride, a copolymer of vinylidene chlorine and acrylonitrile or a copolymer of vinylidene chloride and vinyl chloride; polyethylene terephthalate (Mylar); an ethylene-acrylic acid copolymer; or a Surlyn ionic copolymer. The web 10 can be single thermoplastic material or can comprise a laminate of several thermoplastic materials, such as a polyolefin coated laminate. Preferably, the thermoplastic material comprising the web 10 is a material, such as polyethylene, polypropylene or polyvinylidene chloride, which can form a heat-sealed bond at a relatively low temperature.

The web 10 of heated thermoplastic material is draped over the mouth 13 of the container 14 at a temperature within the range of heat-sealing temperatures and within the range of drooping temperatures of the thermoplastic material. The temperature of the heated thermoplastic material of the web 10 should not be greater than the range of drooping temperatures of the thermoplastic material. Otherwise, the web 10 will melt, rather than sag, and hence be unable to support its own weight when draped over the container mouth 13. The temperature of the heated thermoplastic material of the web 10 also should not be less than its range of heat-sealing temperatures. Otherwise, the web 10 will not be able to form a heat-sealed bond with the container mouth 13. By providing the web 10 of thermoplastic material, having a temperature within both the heat-sealing range and the drooping range of the thermoplastic material, draped over the container mouth 13, a soft and pliable web 10 is obtained which is amenable to being urged into intimate contact with the surfaces of the mouth of a container, particularly a square or rectangular container mouth. In this process, the particular temperature of the draped web 10, within the heat-sealing and drooping ranges of the thermoplastic material, is not critical. For example, when the web 10 is polyethylene or a laminate having an outer layer of polyethylene, the web can be at any temperature between about 300°F and 500°F. At temperatures within this range, the web 10 of polyethylene will be soft and pliable and amenable to being heat-sealed to another polyethylene surface.

In this process, any conventional means 12 for heating the thermoplastic web 10, without overheating or burning the web and without interfering with the draping of the web, at a temperature within the drooping and heat-sealing temperature ranges of its thermoplastic material, over the container mouth 13, can be utilized. Among the heating means 12 which can be used for heating the web 10 are forced air heaters, radiant heaters, as well as heated rollers. The preferred heating means are radiant heaters.

The container 14, when the web 10 is draped over it, preferably contains a product 15 and is positioned in a pocket 16 of a moving converyor 17. It also is preferred tha the container 14, when positioned in the pocket 16 of the conveyor 17 in the first station of this process, be as close as it practical to the heater means 12. In this way, the loss of heat from the web 10, after it leaves the heating means 12 and before it is draped over the container mouth 13, is minimized.

In this process, the container 14 can be thermoplastic container or a thermoplastic coated container. Any conventional thermoplastic or thermoplastic coated container capable of forming a hermetically sealed package can be utilized. The container 14 of this process can be constructed entirely of a thermoplastic material, adapted to be heat-sealed to the web 10. Alternatively, only the interior and exterior surfaces of the container 14 can be made of a thermoplastic material. If desired, only the interior and exterior surfaces of the container mouth 13 can be coated with a thermoplastic material adapted to be heat-sealed to the web 10.

In the process depicted in the Drawings, the container 14 is formed from paperboard. It includes a square container mouth 13 and is coated on it interior and exterior surfaces with a thermoplastic material. In this process, any conventional, thermoplastic coated, paperboard container can be conveniently utilized to form a hermetically sealed package, provided that the interior and exterior thermoplastic coatings of the container are capable of forming a heat-sealed bond with the web 10. For a wide variety of paperboard cartons, polythylene is considered to be the preferred thermoplastic coating for the interior and exterior surfaces of the container 14, with the web 10 also being polyethylene.

The effect of draping the heated web 10 over the container mouth 13 is that the web contacts the upper edge 13a of the container mouth 13. The web 10 thereby overlies the product 15, within the container 14. The heated web 10 also overlies the conveyor belt 17 and a conveyor abutment 18 which surrounds the pocket 16. Preferably, the heated web 10 sags somewhat inwardly of the container, eg., about one half inch.

In carrying out this process, the conveyor 17 is advanced at intermittent intervals away from the roll 11 and heating means 12. The intermittent movement of the conveyor 17 carries the container 14 and the portions of the web 10 overlying it away from the roll 11. The web 10 preferably is unwound from the roll 11 along with the movement of the container 14 on the conveyor 17 so that relative movement between the web 10 and container 14 is minimized. It also is preferred that the position of the roll 11, container mouth 13 and heating means 12 be adapted so that the web 10, when draped over the container mouth 13, contacts substantially the entire upper edge 13a of the container mouth. For this purpose, both the portion of the web 10 draped over the container 14 and the upper edge 13a of the container mouth 13 are aligned in a substantially horizontal plane in the first station of this process. However, if desired, other arrangements and modes of operation of the elements of this process can be utilized for draping the web 10 over the container mouth 13 with a portion of the web sagging inwardly of the container 14.

In this process, the product 15 can be any material which conventionally is packaged in a thermoplastic or thermoplastic-coated container. For example, the product 16 can be milk, fruit juice, sugar, cream, cereal, vegetables, meat products and the like. Preferably, in accordance with this invention, the product is one which will not interfere with the heat-sealing of the web 10 to the mouth 13 of the container 14.

Surrounding the conveyor pocket 16, in which the container 14 is positioned, is the conveyor abutment 18. Preferably, the abutment 18 defines the pocket 16 holding the container 14 in position on the conveyor 17. The uppermost surface 18a of the abutment 18 is preferably spaced below the upper edge 13a of the container mouth 13 so that the web 10 hangs somewhat downwardly from the container mouth 13 and overlies but does not contact the conveyor abutment 18.

Figure 2:
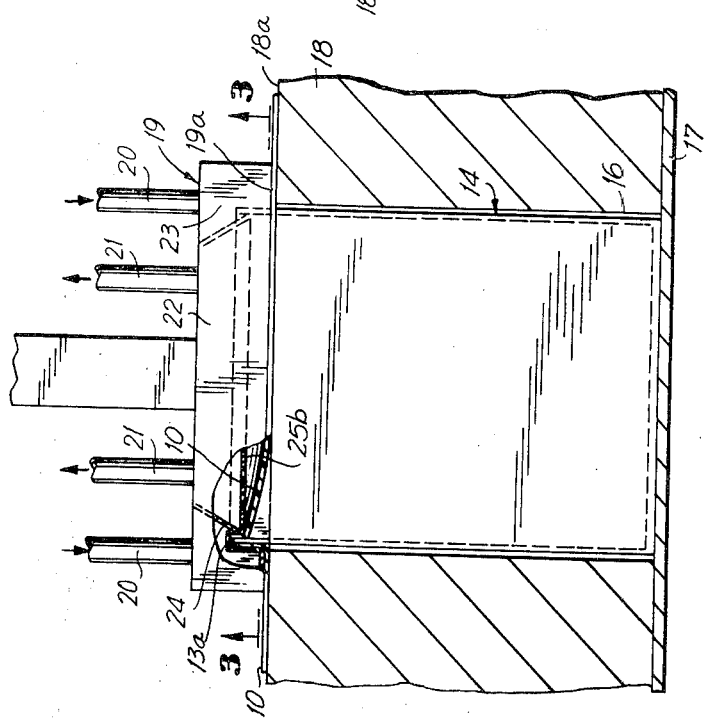
FIG. 2 is a partial, sectional view of the second station in the process of this application, showing the heated web of thermoplastic material draped over the mouth of the container, with a forming mandrel being positioned over the mouth of the container to urge the web inwardly of the mouth of the container. A portion of the mandrel is cut away to show the web overlying the interior and exterior surfaces of the mouth of the container.
Figure 3:
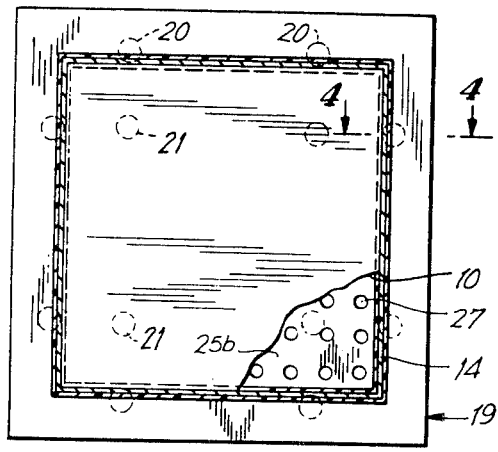
FIG. 3 is a sectional view, taken along line 3—3 in FIG. 2, showing the underside of the web of thermoplastic material, draped over the mouth of the container, at the second station in this process. A portion of the web is cut away to show the forming mandrel.
Figure 4:
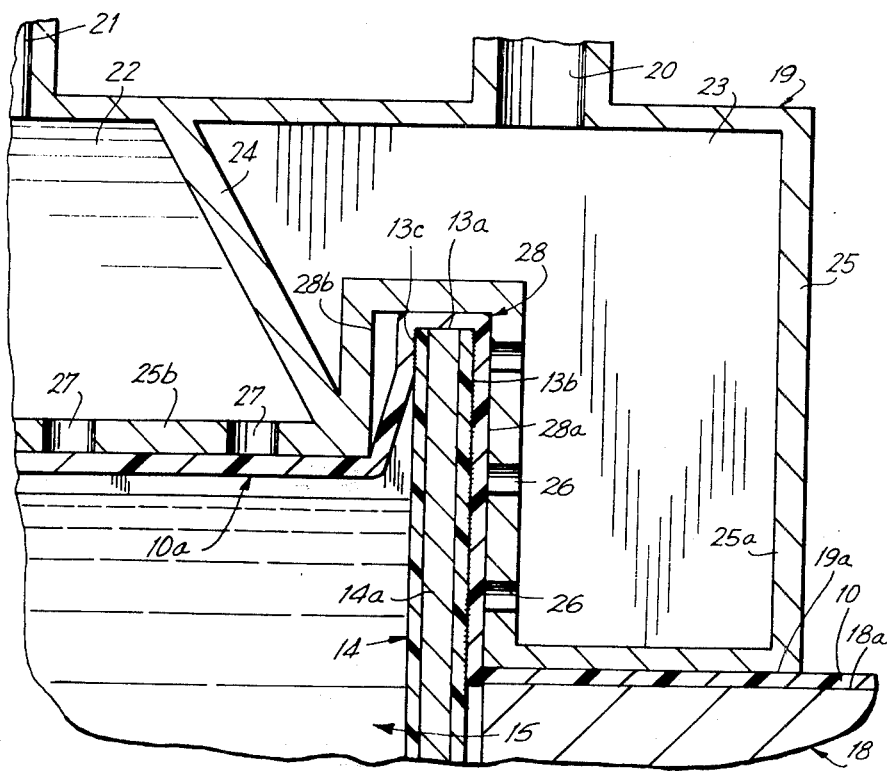
FIG. 4 is an enlarged, sectional view, taken along line 4—4 of FIG. 3, showing the web of thermoplastic material, the container and the forming mandrel, after the web has been heat-sealed to the interior and exterior surfaces of the mouth of the container at the second station of this process.

After the web 10 has been draped over the container mouth 13, the container 14 and overlying web 10 are moved by the conveyor 17 to the second station in this process, shown in FIGS. 2 to 4.

As seen in FIG. 2, in the second step of this process, a forming mandrel, generally 19, is positioned about the mouth 13 of the container 14. The mandrel 19 is adapted to urge the web 10 or portions thereof inwardly of the container mouth 13, when placed about the container mouth, so that the web overlies the interior and exterior, thermoplastic surfaces of the container mouth. In carrying out this step, it is preferred that the web 10 and container mouth 13 be substantially horizontal and that the forming mandrel 19 be positioned about the container mouth 13 by being moved downwardly relative to the container 14.

The forming mandrel 19 is provided with a plurality of gas lines 20 and vacuum lines 21. The gas lines 20 are connected to a source of gas pressure, such as conventional air pump, and the vacuum lines 21 are connected to an apparatus for providing a partical vacuum, such as a conventional vacuum pump. As positioned about the container mouth 13, a lowermost surface 19a of the forming mandrel 19, which is located outside the container 14, contacts the upper surface of the web 10 and presses the web 10 against the uppermost surface 18a of the conveyor abutment 18. Preferably, the pressing contact between the lower surface 19a of the forming mandrel 19, the web 10 and the upper surface 18a of the conveyor abutment 18 is continuous around the entire perimeter of the container 14.

The forming mandrel 19 contains one or more vacuum chambers 22 connected to and in communication with the vacuum lines 21. The forming mandrel 19 also contains one or more gas chambers 23, connected to and in communication with the gas lines 20. Preferably, the gas chamber 23 comprises a single chamber in the forming mandrel 19, a major portion of which is located outside of the perimeter of the container mouth 13. The vacuum chamber 22 also is preferably a single chamber in the forming mandrel 19, located entirely within the perimeter of the container mouth 13.

As best seen in FIG. 4, the vacuum chamber 22 is separated from the gas chamber 23 by a continuous boundary wall 24. If desired, the boundary wall 24 can be formed as an integral piece with the shell, generally 25, of the forming mandrel 19. However, for ease of construction, it may be desirable to form the vacuum chamber 22 and the gas chamber 23 as separate pieces, in which case, the boundary wall 24, between these chambers, would be the abutting shell 25a of the gas chamber 23 and shell 25b of the vacuum chamber 22.

As also best seen in FIG. 4, the gas chamber 23 is in communication with the outside of the forming mandrel 19 through a plurality of gas ports 16 in the gas chamber shell 25a, and the vacuum chamber 22 is in communication with the outside of the forming mandrel 19 through a plurality of vacuum ports 27 in the vacuum chamber shell 25b.

In accordance with the process of this application, the operation of the forming mandrel 19 in conjunction with the web of heated thermoplastic material 10 and the thermoplastic or thermoplastic coated, filled container 14 is as follows.

At the second station of this process, the forming mandrel 19 is positioned over the container mouth 13 so that the lowermost surface 19a of the forming mandrel 19 is in abutting relation with the web 10 and the uppermost surface 18a of the conveyor abutment 18. At this point, a gas, preferably a heated gas is forced through the gas lines 20, into the gas chamber 23, and through the plurality of gas ports 26 in the gas chamber shell 25a. The gas, under pressure, from the gas chamber 23 is directed by the gas ports 26 against the exposed, adjacent surface portions of the web 10 overlying the exterior surface 13b of the container mouth 13. The gas flowing through the gas ports 26 against the surface of the web 10 is of sufficient pressure so that the web 10 presses against the exterior container mouth surface 13b to form an intimate, heat-sealed bond. The force of the gas also urges the container mouth 13 radially inward against the portion of the mandrel shell 25 which is remote from the gas ports 26. In this way, the web 10 of thermoplastic material also is pressed against the interior surface 13c of the container mouth 13, to form an intimate, heat-sealed bond between the web 10 and the container mouth 13. Thereby, the closure 10a of this invention on the container mouth 13 is formed.

It has been found that the particular pressure and temperature of the gas, forced through the gas chamber 23 and the gas ports 26, to press the web 10 against the interior and exterior container mouth surfaces 13b and 13c, to form an intimate, heat-sealed bond is not critical. However, it is preferred that the gas be heated to a temperature of between about 100° and 300°F, particularly a temperature of between 150° and 250°F. It also has been found preferable to use sufficient gas pressure so that the web 10 and container mouth 13 are pressed forcefully against the portion of the mandrel shell 25 remote from the gas ports 26. It is particularly preferred that the pressure in the gas chamber 23 be sufficiently high so that the web 10 and container mouth 13 are pressed forcefully together in the corner regions of a square or rectangular shaped container 14, such as is shown in FIG. 3. For this purpose, it has been found that the preferred gas pressure for pressing the web 10 against the surface of the container mouth 13 to obtain a hermetic seal for a square or rectangular container is about 20 p.s.i.g. to about 50 p.s.i.g.

In the process and apparatus of the application, any conventional gas, which is not unduly combustible and which will not interfere with the packing and storing of the product 15 in the container 14, can be utilized for forming the hermetic, heat-sealed closure. Among the gases which can be used are carbon dioxide, nitrogen, argon and air, preferably air.

At the same time that gas, under pressure, is forced through the gas chamber 23 and the gas ports 26, it is preferred that a partial vacuum be formed in vacuum chamber 22. It has been found that forming a partial vacuum in vacuum chamber 22 pulls the sagging web 10 upwardly, towards the vacuum chamber shell 25b in the region of the vacuum ports 27 and away from the container contents 15. Without the partial vacuum in vacuum chamber 22, the thermoplastic web 10 would tend to harden when cooled in an upwardly concave profile, thereby forming a weak and unattractive closure. In this process, any partial vacuum sufficient to pull the thermoplastic web 10 away from the container contents 15 can be utilized in the vacuum chamber 22. It is preferred, however, that a vacuum of about 15 inches to about 30 inches of mercury be utilized in the vacuum chamber, in accordance with this invention.

When the forming mandrel 19 is positioned about the container mouth 13 so as to urge the web 10 inwardly of the container mouth 13 and so that the web 10 overlies the interior and exterior container mouth surfaces 13b and 13c, the container mouth is located in a moat 28 formed by the shell 25 of the forming mandrel 19. As seen in FIGS. 2 and 4, the moat 28 has a shape and a cross-section which conform closely to the shape and cross-section of the container mouth 13. Preferably, the moat has a depth of about ½ inch in which the mouth of the container can be accommodated, although greater or lesser depths also can be utilized.

At least one wall, i.e., the outermost wall 28a of the moat 28, is formed by the gas chamber shell 25a and contains the gas ports 26. The opposite, innermost wall 28b of the moat 28, remote from the gas ports 26, is the moat surface against which the web 10 and the interior container mouth surface 13c are pressed to heat-seal the web 10 to the container mouth 13. The innermost wall 28b of the moat can be conveniently formed from either the gas chamber shell 25a or the vacuum chamber 25b. The width of the moat 28, between the walls 28a and 28b, should be sufficient to accommodate the mouth 13 of the container 14 and a double thickness of the overlying web 10. Any clearance provided in the width of the moat 28 should be sufficiently small so that the web 10 and container mouth 13 are pressed against the innermost wall 28b of the moat 28 by the stream of gas from the gas chamber 23. It has been found that the thickness of the moat is not critical, and that the parameters of moat thickness and gas pressure can be varied widely to provide an intimate, heat-sealed, plastic to plastic, fiber tearing bond between the web 10 and the interior and exterior container mouth surfaces 13b and 13c. It has been found preferable to provide a moat thickness having a clearance of about .020 inches. However, greater or lesser clearances also can be suitably utilized.

In the process and apparatus of the application, the gas ports 26 can, if desired, be located on the innermost wall 28b of the moat 28 or on both the innermost and outermost walls 28a and 28b of the moat 28. However, it is preferred that the gas ports 26 be provided only on the outermost, moat wall 28a.

The vacuum chamber shell 25b is preferably positioned within the container 14 when the vacuum chamber 22 is provided with a partial vacuum. It is particularly preferred that the vacuum ports 27 be about one-half inch below the container mouth upper edge 13a, inside the container 14, although greater or lesser penetrations also can be utilized. The vacuum chamber shell 25b, if desired, also may be provided with one or more elevated or depressed areas defining design or strengthening ribs about the vacuum ports 27. Such elevations or depressions can be utilized for impressing design or strengthening ribs into the surface of the web 10 merely by pressing the web 10 against the gas chamber shell 25b when the vacuum in the vacuum chamber 22 is formed for pulling the web 10 upwardly, away from the container contents 15.

In constructing the forming mandrel 19 and its gas chamber 23 and vacuum chamber 22, the number and location of the gas and vacuum ports 26 and 27 are not critical. However, it is preferred that numerous gas ports 26 be provided in regions of the gas chamber 23 where difficult heat-sealing problems are anticipated, such as in the corners of square or rectangular containers. Preferably, the forming mandrel 19 also is provided with means for cooling the web 10 to promote the hardening of the resulting closure 10a, after the web is pulled by the vacuum chamber 22 outwardly of the container 14.

As stated above, in the web 10 and in the thermoplastic or thermoplastic coated container 14 of this application, any conventional thermoplastic material capable of being heat-sealed can be utilized. The web 10 is preferably either the same thermoplastic material as is utilized on the interior and exterior surfaces 13b and 13c or the container mouth 13 or is a laminate of barrier materials, the outer layer of which, in contact with the container mouth 13, is the same thermoplastic material as is utilized on the interior and exterior container mouth surfaces 13b and 13c. The preferred thermoplastic materials for both the web 10 and the container 14 are the polyolefins, especially polyethylene. It has been found that a container 14 comprising a laminate of an inner layer of paperboard 14a and outer layers of a heat-sealable, thermoplastic material, preferably polyethylene, can be suitably heat-sealed in accordance with this application to a web 10 of a barrier material. It has been found, in this regard, that the preferred material for sealing a 3½ inches × 3½ inches, square paperboard container 14, coated with 1 mil, low density polyethylene, is a web of about 20 mil, high density polyethylene. The resulting container closure is substantially hermetic and does not require that additional sealing materials be applied to the corners of the container or closure to render it suitable for milk, soap, liquid detergents and the like.

Figure 5:
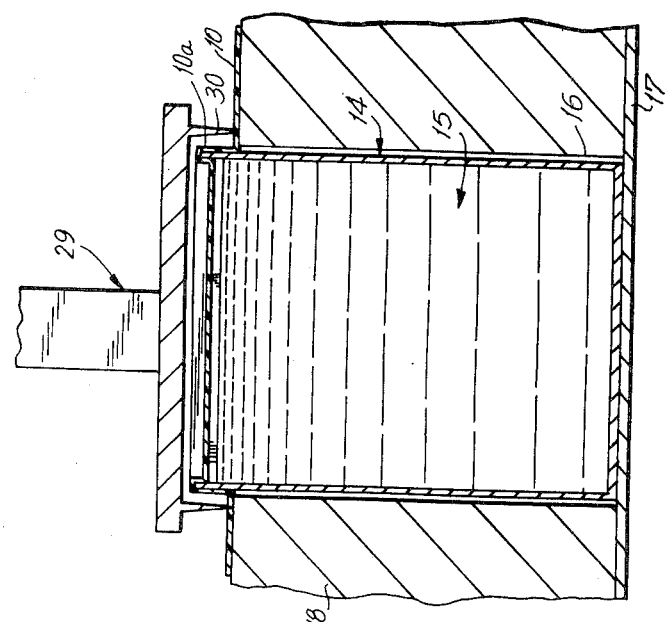
FIG. 5 is a sectional view of the third station in the process of this application, showing the container and its hermetic, heat-sealed closure being severed from the web of thermoplastic material.

The last step of the process of this application is seen in FIG. 5. The container 14, having thermoplastic closure 10a heat-sealed to its mouth 13, has been moved by the conveyor 17 from the second station, showed in FIGS. 2–4, to the third station shown in FIG. 5. At the third station, the web 10 is cut away from the closure 10a by a cutting member, generally 29. The cutting member 29 includes a conventional, circumferential knife 30. The cutting member 29 and the knife 30 are adapted to be pressed downwardly, about the container 14, to cut the web 10 against the conveyor abutment 18. By the action of the cutting member 29, the closure 10a and container 14 are freed from the web 10. The container 14 can thereafter be conveyed, in a conventional manner, to subsequent stations for operations, such as labelling and boxing.

It is considered that the invention and many of its attendant advantages will be understood from the foregoing description and that it will be apparent that various changes may be made in the steps of the process described or in the apparatus utilized to carry out the process without departing from the spirit and scope of the invention or sacrificing all of its material advantages, the process hereinbefore described being merely a preferred embodiment.

I claim:

1. A process for forming a hermetic, heat-sealed closure on a filled, thermoplastic or thermoplastic coated container, comprising the steps of:

providing a web of a thermoplastic material, having a temperature within the drooping and heat-sealing ranges of the thermoplastic material, draped over the mouth of the container;

urging the web inwardly of the mouth of the container so that the web simultaneously overlies both interior and exterior, thermoplastic surfaces of the mouth of the container; said interior and exterior surfaces comprising first and second thermoplastic surfaces of the mouth of the container; and directing a stream of a gas against an exposed surface of the web overlying the first of said thermoplastic surfaces of the mouth of the container to cause the web to contact said first surface and to forcefully press the second of said thermoplastic surfaces of the mouth into contact with a portion of the web which overlies said second surface, to thereby form a heat-sealed bond between the web and both the interior and exterior thermoplastic surfaces of the mouth of the container.

2. The process of claim 1 wherein the web is a continuous web.

3. The process of claim 1 wherein the web is pulled upwardly by a partial vacuum at the same time that the web is pressed against the interior and exterior surfaces of the mouth of the container.

4. The process of claim 1 wherein the container has a square or a rectangular mouth.

5. The process of claim 4 wherein the container is a thermoplastic coated, paperboard container.

6. The process of claim 4 wherein the stream of a gas is heated to about 100°F to 300°F.

7. The process of claim 6 wherein the stream of a gas is heated to 150°F to 250°F.

8. The process of claim 6 wherein the stream of a gas has a pressure of about 20 p.s.i.g. to about 50 p.s.i.g.

9. The process of claim 8 wherein the web is pulled upwardly by a partial vacuum of about 15 inches to about 30 inches of mercury when the web is pressed against the interior and exterior surfaces of the mouth of the container.

10. The process of claim 1 wherein the gas is air.

11. The process of claim 1 wherein the stream of gas is directed against the exposed surface of the web overlying the exterior, thermoplastic surface of the mouth of the container.

12. The process of claim 1 wherein the web of a thermoplastic material, having a temperature within the drooping and heat-sealing ranges of the thermoplastic material, is provided by heating a continuous web of the thermoplastic material.

* * * * *